Dec. 22, 1942.   H. LAUER   2,305,625

FREQUENCY REDUCING DEVICE FOR ELECTRIC ALTERNATING CURRENTS

Filed Dec. 12, 1940   4 Sheets-Sheet 1

Henri Lauer INVENTOR.

BY his attorney

Dec. 22, 1942.  H. LAUER  2,305,625
FREQUENCY REDUCING DEVICE FOR ELECTRIC ALTERNATING CURRENTS
Filed Dec. 12, 1940   4 Sheets-Sheet 2

INVENTOR.
Henri Lauer
BY

Patented Dec. 22, 1942

2,305,625

UNITED STATES PATENT OFFICE 2,305,625

FREQUENCY REDUCING DEVICE FOR ELECTRIC ALTERNATING CURRENTS

Henri Lauer, New York, N. Y.

Application December 12, 1940, Serial No. 369,725

7 Claims. (Cl. 250—36)

The present invention relates to a frequency reducing device for electric alternating currents, which actuated by a single-phase electric alternating current, will furnish a polyphase alternating current or electromotive force the frequency of which is a sub-multiple of that of the actuating current.

This device utilizes, in particular, the property of certain electron-tubes circuit arrangements capable of a plurality of possible modes of operation or operating equilibriums, to pass from one of said modes to another one under the influence of a temporary electrical impulse of suitable direction and amplitude, and to revert back to the original mode of operation under the influence of another temporary impulse of suitable amplitude and opposite direction. Such electron-tube circuit arrangements being capable to develop oppositely directed electromotive forces according to which one of two possible modes they are operating on, will be referred to in the present specification as "reversible apparatus."

An example of such reversible apparatus may be found in an arrangement of two triodes having their cathodes connected to each other, while the plate of each tube is connected to the cathode through an energizing battery in series with a resistance, and the grid of each tube is connected conductively to a suitable point of the plate circuit of the other tube. Such an arrangement, as known, can operate with a strong current in the first tube and a weak current in the second tube, or with a weak current in the first tube and a strong current in the second tube.

Another reversible apparatus is constituted by a magnetron or magnetically controlled diode, the magnetic control winding of which is connected, with the proper polarity, in series with the plate-filament discharge path of the tube, which may then operate with either a strong or a weak discharge current.

The frequency reducing device forming the object of the present invention is composed of a number, at least equal to the frequency transformation ratio of the device, of circuit systems, each of which comprises a reversible apparatus as just defined. Each system is operatively connected, coupled or related to the source of alternating current the frequency of which is to be reduced, by means of differentially arranged rectifiers or rectifying relays, through which impulses from the said alternating current source are transmitted to the circuit systems, in which they reverse the operating polarity or equilibrium of those reversible apparatus the prevailing operating polarity permits such a reversal to take place.

The systems being, further, considered in a given order, each system is connected or coupled to the following one, and the last one is connected or coupled to the first one, through relays or the like, in such a manner that the operating connection or coupling polarity of any one system to the alternating current source through the differentially arranged rectifiers or rectifying relays will depend on the prevailing operating polarity of the reversible apparatus belonging to the system preceding immediately the particular system considered. This reversible apparatus is made to provide a polarizing voltage or current to the said differential rectifiers or rectifying relays.

Thus, in devices having an odd frequency transformation ratio, either the positive or the negative cycle portions of the input current will be capable to effectively operate in any given system, depending on the operating polarity of the reversible apparatus belonging to the system preceding immediately the particular system considered.

In devices having an even frequency transformation ratio, the positive cycle portions of the input current will be capable to operate in the systems of even rank, the negative cycle portions of said current will be capable to operate in the systems of odd rank, and it is the direction in which they may operate in any given system which will depend on the operating polarity of the reversible apparatus belonging to the system preceding the particular system considered. The invention will be better understood from the following description when considered in reference to the accompanying drawings, in which:

Figure 5:
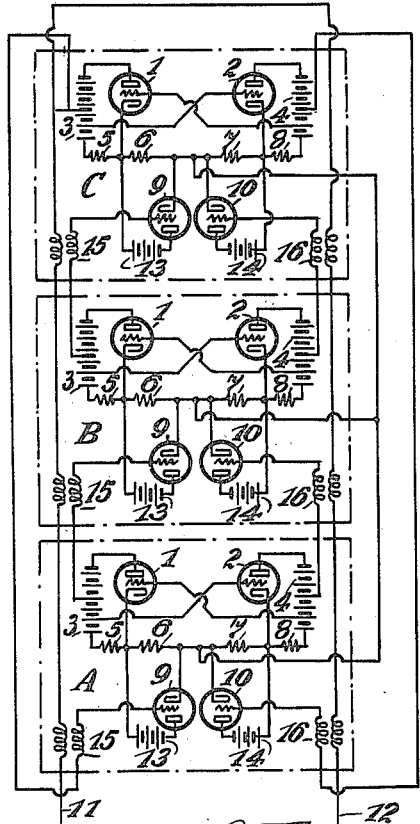

Figure 5 refers also to a frequency reducing device having a frequency transformation ratio of three to one and employing three circuit systems, but in which the applied voltage operates in the grid circuits of the input tubes, instead of in their plate circuits.

Figure 6:
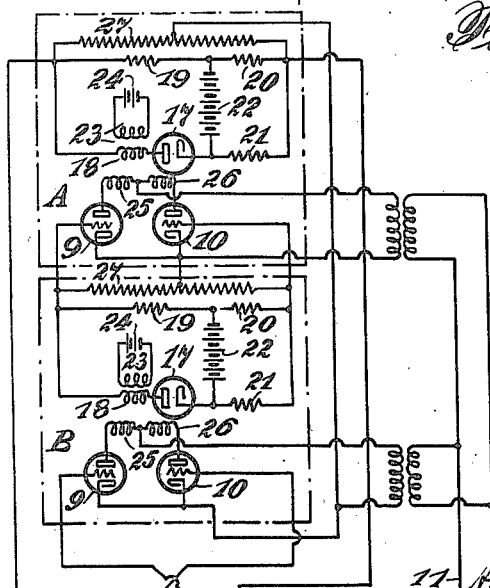

Figure 6 shows a frequency reducing device having a frequency transformation ratio of two to one and comprising two circuit systems, in each of which the reversible apparatus employs a magnetically controlled diode or magnetron circuit instead of the conductively interconnected triode pair arrangements used in the examples of the preceding figures.

Figure 7:
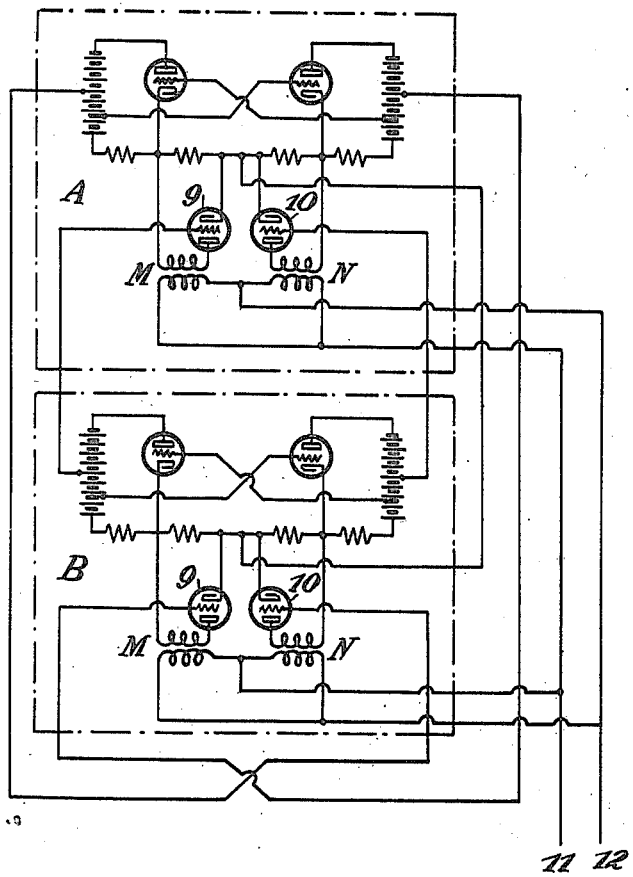

Figure 7 shows a frequency reducing device having a frequency transformation ratio of two to one and employing two circuit systems, in which the input tubes are coupled inductively to the input terminals of the device, instead of conductively as in the preceding examples.

Figure 8:
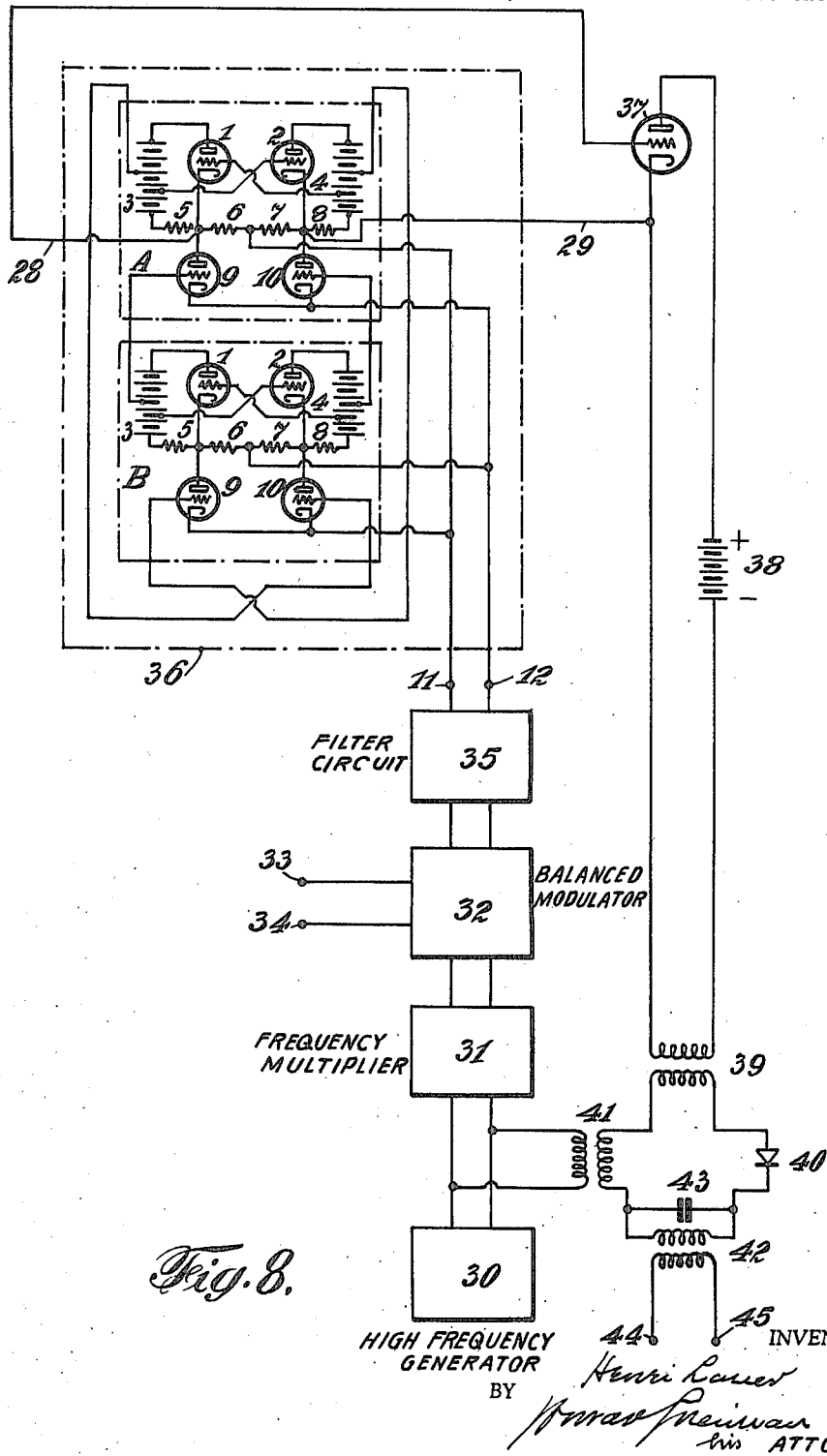

Figure 8 shows a frequency reducing system in which operational harmonics are substantially eliminated or reduced from the output electromotive force produced.

Figure 1:
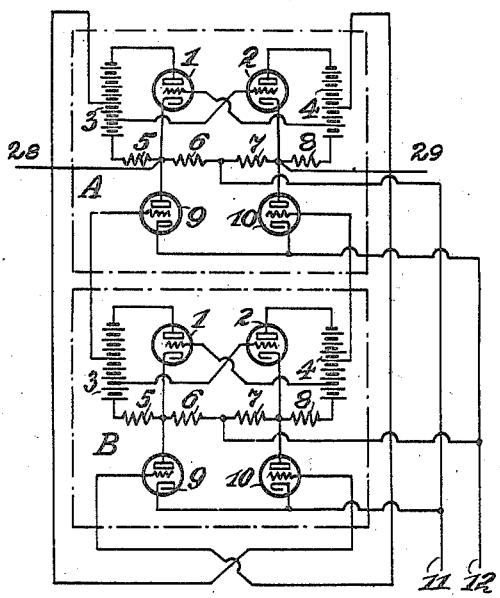
Figure 1 is a wiring diagram of a frequency reducing device of even frequency transformation ratio, comprising two circuit systems so connected and arranged as to constitute a frequency halving device.

Referring to Figure 1 of the drawings, there is shown a frequency halving device, that is, a device having a frequency transformation ratio of 2 to 1. It is constituted by two similar circuit systems A and B each of which comprises a reversible apparatus composed of two triodes 1, 2 the plate circuits of which are energized, respectively, by a battery 3 in series with a resistance 5, and a battery 4 in series with a resistance 8. The cathodes of the two tubes are connected to each other by resistances 6, 7 in series, while the grid of each tube is connected to some suitable point of the plate circuit of the other tube. Each system also comprises two triodes 9, 10 having their filaments connected together, while their plates are respectively connected to the cathodes of tubes 1 and 2. The grids of tubes 9 and 10 of system A are connected respectively to suitable points of the plate circuits of tubes 1 and 2 of system B, while the grids of tubes 9 and 10 of system B are respectively connected to suitable points of the plate circuits of tubes 2 and 1 of system A. Finally, the input terminals 11, 12 which receive the alternating electromotive force actuating the device are connected as follows: terminal 11 is connected to the filaments of tubes 9, 10 of system B and to the common point of resistances 6, 7 of system A, while terminal 12 is connected to the filaments of tubes 9, 10 of system A and to the common point of resistances 6, 7 of system B. Tubes 9, 10 will thus rectify the input electromotive force and impress the resulting unidirectional impulses upon the reversible apparatus of their respective systems, in a direction which results from their differential action, and which in turn is governed by the operating polarity of the reversible apparatus belonging to the other system.

Explaining the operation of the device, suppose first that in each system the current in tube 1 is greater than that in tube 2 and that, applying the alternating input electromotive force to terminals 11, 12, the first cycle portion of this input electromotive force makes terminal 11 positive and terminal 12 negative. Current will then flow in tubes 9, 10 of system A, but not in tubes 9, 10 of system B. Now, in view of the prevailing operating polarity of the reversible apparatus of system B, the grid of tube 9 of system A is more negative (or less positive) than that of tube 10 of this same system, so that the current in the latter tube will be greater than that in tube 9. The resulting potential difference between the ends of the circuit branch 6—7 of system A will hence tend to make, in this same system, the grid of tube 1 more negative, that of tube 2 more positive, and the operating polarity of the reversible apparatus of system A will reverse. At the end of this first cycle portion of the input electromotive force, the current in tube 1 of system A will hence be smaller than that in tube 2 of this same system (while in system B the original conditions remain unchanged).

The second portion of the input electromotive force makes terminal 11 negative, terminal 12 positive, so that current will now flow through tubes 9, 10 of system B but not through tubes 9, 10 of system A. And in view of the prevailing operating conditions of the triode pair 1—2 of system A, which makes the grid of tube 9 of system B more negative (or less positive) than that of tube 10 of this same system, the current in this tube 9 will be smaller than that in tube 10. This produces a potential difference between the ends of the circuit branch 6—7 tending to make the grid of tube 1 of system B more negative than that of tube 2, which in turn produces a reversal of the operating polarity of the triode pair 1—2. At the end of this second cycle portion of the input electromotive force, the current in tube 1 of system B will hence be smaller than that in tube 2 of this same system.

The third cycle portion of the input electromotive force makes terminal 11 positive and terminal 12 negative, and the input current now flows through tubes 9, 10 of system A. In view of the new operating polarity of the triode pair 1—2 of system B, the current in tube 9 of system A is greater than that in tube 10, and the resulting potential difference between the ends of the circuit branch 6—7 produces a reversal of the operating equilibrium of the triode pair 1—2 of system A. At the end of this third cycle portion, the current in tube 1 of system A will hence be greater than that in tube 2 of this same system.

Reasoning along similar lines, it is seen that the fourth cycle portion of the input electromotive force produces a reversal of the operating equilibrium of the triode pair 1—2 of system B, so that at the end of this fourth cycle portion, the original operating conditions are restored on both systems A and B. The entire process repeats itself with the following cycle portions of the input electromotive force, and it is thus seen that, in each circuit system, potential differences will be developed having a fundamental frequency equal to one-half the frequency of the input electromotive force applied to the input terminals 11, 12 of the device.

Figure 2:
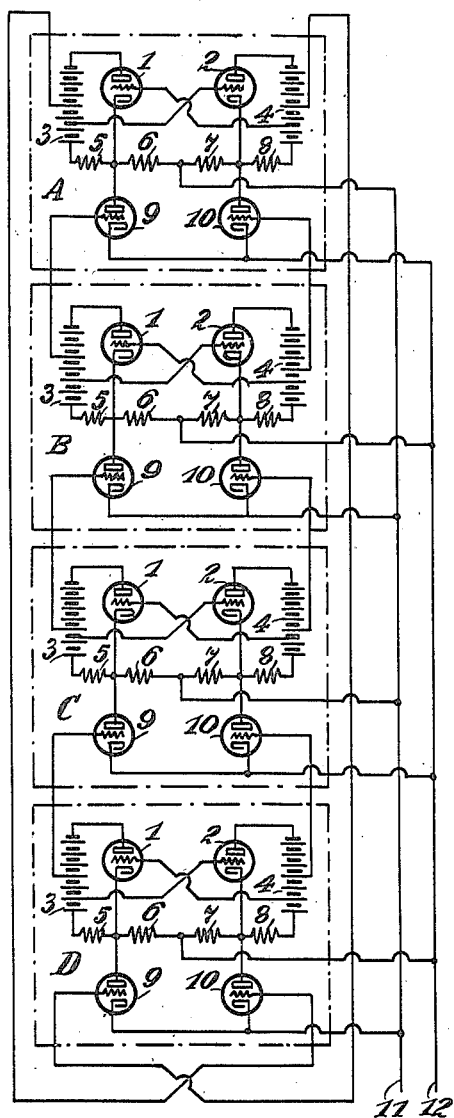
Figure 2 shows a similar arrangement, but embodying four circuit systems similar to those of Figure 1, connected to form a frequency reducing device capable to produce voltages having a fundamental frequency equal to one-quarter of that of the voltage applied to the input terminals of the device.

Figure 2 shows a similar arrangement, but embodying four circuit systems and capable to develop potential differences having a fundamental frequency equal to one-quarter of that of the input electromotive force. The operation may be explained along lines similar to those followed for explaining the operation of the device of Fig. 1. Thus for instance, assume that the current in tube 1 is greater than that in tube 2 in systems A, B, D, and smaller than that in tube 2 in system C. If the first cycle portion of the electromotive force applied to the input terminals makes terminal 12 negative and terminal 11 positive, it will be seen readily that a reversal of the operating equilibrium of the triode pair 1—2 will be brought about in system A, that the following cycle portion of the input electromotive force, making terminals 12 and 11 respectively positive and negative, produces a reversal of operation in the triode pair 1—2 of system D, the third cycle portion produces a reversal in system C, the fourth in system B, and so on.

Figure 3:
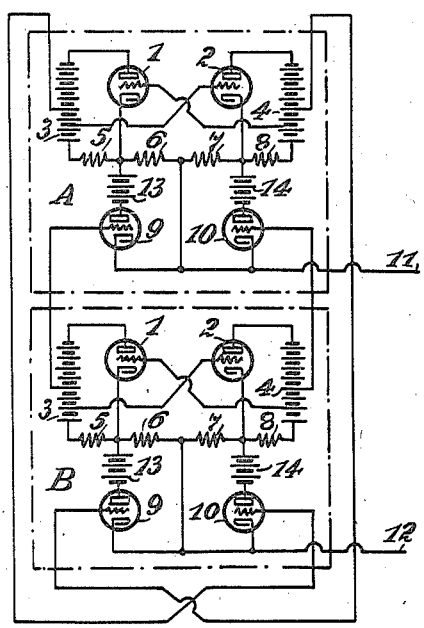
Figure 3 represents a frequency reducing device having a frequency transformation ratio of two to one and employing two circuit systems, in which, contrary to the arrangements of Figure 1 and Figure 2, the applied alternating voltage operates in the grid circuits of the input tubes instead of in their plate circuits.

Instead of operating in the plate circuits of the rectifier tubes 9, 10, the input electromotive force may be made to operate in the grid circuits of these tubes, as for instance in the arrangement of Figure 3, which shows a device having a 2 to 1 frequency transformation ratio. This arrangement differs from that of Figure 1 in that the tubes 9, 10 have their plate circuits energized, respectively, by batteries 13, 14, while the filaments of tubes 9, 10 are connected to the common point of resistances 6, 7. The potentials of batteries 13, 14 and the connection points of the grids of tubes 9, 10 to the reversible apparatus of the preceding circuit system are so chosen that, when no electromotive force is applied to the input terminals 11, 12 of the device, the least negative of the grids of tubes 9, 10 will be just negative enough to prevent plate current flow in the tube. The input terminals 11, 12 being connected to the filaments of tubes 9, 10 of systems A and B respectively, an electromotive force applied to these terminals will make the grids of tubes 9, 10 more negative in one of the systems, less negative in the other system, and permit differential rectification to take place in the latter system. The operation may easily be explained in a manner fairly similar to that followed for the preceding cases.

Figure 4:
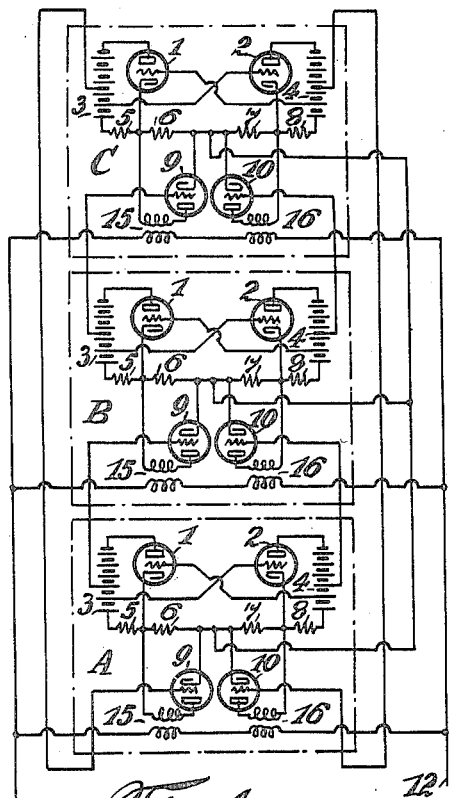
Figure 4 is an illustration of a frequency reducing device of odd frequency transformation ratio, employing three circuit systems arranged to develop voltages having a frequency equal to one-third of that of the applied voltage.

Figure 4 shows a device having an odd frequency transformation ratio, equal to 3 to 1, and composed of three circuit systems A, B, C. The reversible devices consist of triode pairs 1—2 arranged in the same manner as in the preceding examples, but the common points of resistances 6, 7 of all systems are here connected together. The filaments of the rectifier tubes 9, 10 are connected to the common point of resistances 6, 7 while the plates of these tubes are connected to the cathodes of tubes 1, 2 of their own system respectively, through the secondary windings of transformers 15, 16, the primary windings of which are connected to the input terminals 11, 12, of the device in such a manner that when an alternating electromotive force is impressed upon the terminals 11, 12, the plates of all tubes 9 will become positive or negative together while the plates of all tubes 10 become, respectively, negative or positive together, and vice versa. Finally the connection points of the grids of tubes 9, 10 of one system to the reversible apparatus of the preceding system are so chosen that the internal resistance of the tube having the more negative grid will be practically infinite, within the voltage operating range of the input electromotive force, while that of the tube having the less negative grid will be of comparatively low value.

Under these conditions, suppose first that in system A the current in tube 1 is smaller than that in tube 2, while in systems B and C the current in tube 1 is greater than that in tube 2. Suppose also that the first cycle portion of the input electromotive force makes the plates of all tubes 9 negative, and those of all tubes 10 positive. Current may then flow in these latter tubes only, but in view of the assumed operating conditions of the triode pairs 1—2 and the resulting grid potentials of tubes 10, current will flow only in tubes 10 of systems A and C. And the resulting potential differences between the ends of the circuit branches 6—7 of these systems will bring about an operating equilibrium reversal of the triode pair 1—2 of system C, but not of system A. The following cycle portion of the input electromotive force makes the plates of tubes 10 negative, and those of tubes 9 positive, allowing current to flow in these latter tubes. But in view of the prevailing operating conditions of the triode pairs 1—2, current will flow in tubes 9 of systems A and B only, bringing about a reversal of operating conditions in the triode pair 1—2 of system A. Continuing the explanation along similar lines, it may be seen that the third cycle portion of the input electromotive force will produce an equilibrium reversal of the triode pair 1—2 in system B, the fourth cycle portion reverses the operation in system C, the fifth in system A, the sixth in system B, and so on.

Figure 5 shows a similar arrangement, of 3 to 1 ratio, but in which the input electromotive force operates in the grid circuits of tubes 9, 10 instead of in the plate circuits of these tubes, making the grids of all tubes 9 less negative or more negative together, while making the grids of all tubes 10 correspondingly more negative or less negative. The plate circuits of these tubes 9, 10 are energized by batteries 13, 14.

Figure 6 shows a 2 to 1 ratio device, equivalent to that of Figure 1, but illustrating the use of reversibile apparatus utilizing a magnetically controlled diode. Each of the two circuit systems A, B comprises such a diode 17 connected in series with its control winding 18 and forming one of the four arms of a Wheatstone bridge arrangement, the three other arms of which are formed by resistances 19, 20, 21, the combination being energized by a battery 22. An auxiliary winding 23, energized by a battery 24, provides a permanent magnetic field, such that the tube 17 may operate with either high or low current intensity. The "bridge" diagonal terminals, constituted by the ends of the circuit branch 19—20, are connected to the grids of the rectifier tubes 9, 10 of the other circuit system of the device, while the center point of the bridge branch 27 is connected to the filaments of these rectifier tubes. Finally, the plate circuits of the rectifier tubes 9, 10 comprise windings 25, 26 the differential magnetic field of which combines with the magnetic field of the diode windings. The bridge arrangement is balanced in such a manner that a potential difference will be developed across the circuit branch 27 which will be of one polarity when the diode operates with high current, and of the other polarity when the diode operates with low current.

Under these conditions, and with the connections shown, it will be assumed that high diode current in system A produces a high internal resistance of tube 10 of system B and a low internal resistance of tube 9 of system B; that a low diode current in system A produces a low resistance of tube 10 of system B and a high resistance of tube 9 of system B; that a low diode current in system A produces a low resistance of tube 10 of system B and a high resistance of tube 9 of system B; that a high diode current in system B produces a high resistance of tube 9 of system A and a low resistance of tube 10 of system A; and a low diode current in system B produces a low resistance of tube 9 of system A and a high resistance of tube 10 of system A.

Tubes 9 and 10 being, on the other hand, connected to the input terminals of the device in such a manner that, when an alternating electromotive force is applied to these, the plates of tubes 9, 10 of system A become positive or negative when plates of tubes 9, 10 of system B become respectively negative or positive, and conversely, it will be assumed that when the current in tube 9 is greater than that in tube 10 the diode will be brought to carry high current, while it will be brought to carry low current when the current in tube 9 is smaller than that in tube 10.

Starting operation with a high current in the diodes of both systems A and B, suppose the first cycle portion to make the plates of tubes 9, 10 of system A positive, and those of tubes 9, 10 of system B negative. In view of the prevailing operating conditions, current in tube 10 of system A will be greater than that in tube 9 of this same system, with the result that, at the end of this first cycle portion of the input electromotive force, the diode of system A will be operating with low current intensity. The second cycle portion of the input electromotive force sends current through tubes 9, 10 of system B, with the higher current through tube 10, the lower current through tube 9, which in turn brings the diode of system B to operate with low current intensity. The third cycle portion sends current through tubes 9, 10 of system A, with the higher current in tube 9, so that the diode of system A is brought to carry current of high intensity. The fourth cycle portion, through a similar mechanism, brings the diode of system B to carry current of high intensity. Original conditions are thus restored, and the process begins over again.

Finally, Figure 7 shows an arrangement having a 2 to 1 ratio, and which is a variation from that of Figure 1, in that the rectifier tubes 9, 10 are connected to the input terminals 11, 12 through transformers M, N. These are arranged in such a manner that the plates of tubes 9, 10 of one system become positive or negative together while the plates of tubes 9, 10 of the other system become, respectively, negative or positive together, and vice versa. The explanation of the operation is substantially the same as for the arrangement of Figure 1.

From the above explanations of the operation of a few examples of possible forms of the frequency reducing device forming the object of the present invention, it may be understood that sub-multiple frequency electromotive forces are developed in each one of the circuit systems of the device. These sub-multiple frequency electromotive forces may be taken off suitable points of the circuit systems, which then form the output terminals of the device, from which may be actuated by said sub-multiple frequency electromotive forces such apparatus as desired depending on the particular application in view, either by coupling or connecting such apparatus directly to said output terminals, or by coupling or connecting to said terminals the control circuit of an electron tube amplifier, the output circuit of which actuates said apparatus.

The output terminals may in particular be taken off the plates of the input tubes 9, 10 of any one system, or, in case of Figures 1, 2, 3, 4, 5, as the ends of the circuit branch 6—7 of any one system, so that in this latter instance the output terminals are formed, respectively, by the connection points of resistances 5, 6, and 7, 8, as shown by the output terminal wires 28, 29 of Figure 1 connected to said points. The output electromotive force contains, however, through the very operation of the device, harmonics which are not present in the original input electromotive force. These operational harmonics may be eliminated to a great extent in the following manner. Instead of applying to the input terminals 11, 12 of the device the original electromotive force the frequency of which is to be reduced, this is made to modulate the amplitude of a high frequency "carrier" electromotive force, and one of the two resulting side frequency band electromotive forces is applied to the input terminals 11, 12 of the frequency reducing device. The output electromotive force of the device, as developed between the plates of the rectifier tubes 9, 10 of one of the circuit systems by the differential action of the said tubes, is then combined with a substantially sinusoidal alternating auxiliary electromotive force the frequency of which is a sub-multiple of that of the above-mentioned "carrier" in the same ratio as the frequency transformation ratio of the frequency reducing device used. (The "carrier" current may, preferably, be obtained by means of said "auxiliary" current, through a frequency multiplier of suitable ratio.) These combined electromotive forces are then impressed upon an alternating-current rectifier, the low-frequency output component of which may be selected by means of a filter circuit and constitutes the low frequency output electromotive force of the system, which contains a substantially smaller amount of the undesired operational harmonics developed by the device.

As an illustration, reference is made to the schematic diagram of Figure 8, where a high-frequency generator 30 producing an alternating current of substantially sinusoidal wave shape is made to operate a frequency multiplier 31, the multiple-frequency output of which energizes a balanced modulator 32. The control or modulating circuit terminals 33, 34 of this modulator are actuated by the alternating electromotive force, the frequency of which is to be reduced. The resulting amplitude-modulated output voltage of the modulator 32 is then impressed upon a filter circuit 35 designed to allow the passage of one of the two side-frequency band voltages developed by the action of modulator 32, and this side-frequency band voltage is applied to the input terminals 11, 12 of one of the frequency reducing devices 36 described in the present specification, for example, one similar to the frequency halving device of Figure 1, but may consist of any other form of the device described. The output voltage of this device 36, taken off the plates of one of the rectifier tube pairs 9—10 of the device through wires 28, 29 connected to said plates, is applied, through the amplifier tube 37 energized as usual by a battery 38, and through the transformer 39, upon an alternating current rectifier 40. This rectifier 40 is also subjected to an alternating voltage derived through the transformer 41, from the alternating current generator 30.

The rectifier circuit 39—40—41 comprises also a transformer 42, shunted by a high-frequency by-pass condenser 43, and the frequency multiplier 31 is designed to have a frequency transformation ratio equal to the inverse of the frequency transformation ratio of the frequency reducing device 36, that is to say, being for instance a frequency doubler if, as in the present instance, the frequency reducing device 36 is a frequency halving device. The voltage then developed between the secondary or output terminals 44, 45 of the transformer 42 constitutes the output alternating voltage of the system.

What I claim is:

1. A frequency reducing device for electric alternating currents including a pair of single phase high frequency input voltage terminals, a plurality of circuit systems each comprising in combination a pair of electron discharge alternating current rectifying relays provided with a differential output circuit and a control circuit, means electrically connecting the rectifying elements of each of said pair of relays to said terminals, an electron discharge reversible apparatus connected to said output circuit, means for applying the differential output voltage or current of said relays to said electron discharge reversible apparatus, means for connecting said control circuit to the electron discharge reversible apparatus of another of said circuit systems to provide a polarizing voltage for governing the differential operation of said relays, and a pair of output terminals connected to points of said output circuit where said pair of relays produce a differential voltage.

2. A frequency reducing device for electric alternating currents including a pair of single phase high frequency input voltage terminals, a plurality of circuit systems each comprising in combination a pair of electron discharge alternating current rectifying relays provided with a differential output circuit and a control circuit, means electrically connecting the rectifying elements of each of said pair of relays to said terminals, a pair of electron discharge tubes conductively inter-connected to form a reversible apparatus operating with strong current in one tube and weak current in the other tube and connected to said output circuit, means for applying the differential output voltage or current of said relays to said reversible apparatus, means for connecting said control circuit to the reversible apparatus of another of said circuit systems to provide a polarizing voltage for governing the differential operation of said relays, and a pair of output terminals connected to points of said output circuit where said pair of relays produce a differential voltage 3. A frequency reducing device for electric alternating currents according to claim 2 in which said means for applying the differential output voltage or current of said rectifying relays to said reversible apparatus are connected in a common part of the grid circuits of the said pair of conductively interconnected electron discharge tubes forming said reversible apparatus, to operate in opposite directions in said grid circuits.

4. A frequency reducing device for electric alternating currents having an odd frequency transformation ratio, including a pair of single phase high frequency input voltage terminals, an odd number of circuit systems each comprising in combination a pair of electron discharge alternating current rectifying relays provided with a differential output circuit and a control circuit, means for oppositely connecting the rectifying elements of each of said relays to said terminals to actuate said relays in phase opposition by said input voltage, an electron discharge tube reversible apparatus connected to said output circuit, means for applying the differential output voltage or current of said relays to said reversible apparatus, means for connecting said control circuit to the reversible apparatus of another of said circuit systems to provide a polarizing voltage for governing the differential operation of said relays, and a pair of output terminals connected to said output circuit.

5. A frequency reducing device for electric alternating currents having an even frequency transformation ratio, including a pair of single phase high frequency input voltage terminals, an even number of circuit systems each comprising in combination a pair of electron discharge alternating current rectifying relays provided with a differential output circuit and a control circuit, means for similarly connecting said relays to said terminals to actuate said relays in phase conjunction by said input voltage and in such a manner that said relays belonging to those of said systems which are of even rank shall rectify the negative cycle portions of the voltage applied to said terminals and that said relays belonging to those of said systems which are of odd rank shall rectify the positive cycle portions of said voltage, an electron discharge reversible apparatus connected to said output circuit, means for applying the differential output voltage or current of said relays to said reversible apparatus, means for connecting said control circuit to the reversible apparatus of another of said circuit systems to provide a polarizing voltage for governing the differential operation of said relays, and a pair of output terminals connected to said output circuit.

6. A frequency reducing device for electric alternating currents according to claim 1, in which said reversible apparatus of each of said circuit systems comprises a magnetically controlled electron discharge tube with a permanently energized magnetizing winding, control windings connected in said output circuit of said rectifying relays, a main control winding connected in series with the discharge path of said tube, a Wheatstone bridge circuit one of the four arms of which is formed by said tube and main control winding and the bridge circuit branch of which is connected in the control circuit of the rectifying relays of another of said circuit systems to provide a polarizing voltage governing the differential operation of said relays of said other circuit system.

7. A frequency reducing system for electric alternating currents comprising in combination a single phase high frequency alternating carrier current generator, a modulator connected to said generator and to a source of modulating vibrations for varying the amplitude of said carrier current in accordance with the instantaneous value of said vibrations, a frequency selecting circuit for separating and transmitting one sidefrequency band of the modulator high frequency output voltage, a frequency reducing device according to claim 1 having its input terminals connected to said selecting circuit to be energized by said side-frequency band voltage, and an alternating current rectifier connected to the output terminals of one of the circuit systems of said frequency reducing device together with an auxiliary generator producing a substantially sinusoidal alternating voltage having a frequency which is a sub-multiple of that of said alternating carrier current in the same ratio as the frequency transformation ratio of said frequency reducing device.

HENRI LAUER.